(12) United States Patent
Puck (10) Patent No.: US 9,572,297 B2
(45) Date of Patent: Feb. 21, 2017

(54) FLOATING MANURE AGITATOR

(71) Applicant: Benny D. Puck, Manning, IA (US)

(72) Inventor: Benny D. Puck, Manning, IA (US)

(73) Assignee: Puck Custom Enterprises, Inc., Manning, IA (US)

( * ) Notice: Subject to any disclaimer, the term of this patent is extended or adjusted under 35 U.S.C. 154(b) by 0 days.

(21) Appl. No.: 15/259,807

(22) Filed: Sep. 8, 2016

(65) Prior Publication Data

US 2016/0374262 A1 Dec. 29, 2016

Related U.S. Application Data

(63) Continuation of application No. 13/323,020, filed on Dec. 12, 2011, now Pat. No. 9,462,741.

(51) Int. Cl.
| | |
|---|---|
| *A01C 3/02* | (2006.01) |
| *B01F 13/00* | (2006.01) |
| *B01F 5/02* | (2006.01) |
| *B01F 15/02* | (2006.01) |
| *B01F 15/00* | (2006.01) |

(52) U.S. Cl.
CPC ............. *A01C 3/026* (2013.01); *B01F 5/0218* (2013.01); *B01F 13/0049* (2013.01); *B01F 15/00305* (2013.01); *B01F 15/00538* (2013.01); *B01F 15/0243* (2013.01); *B01F 2215/0003* (2013.01)

(58) Field of Classification Search
CPC ................ B01F 13/0049; B01F 5/0218; B01F 2215/0003; A01C 3/026
USPC ........................ 366/262–266; 440/42; 417/61
See application file for complete search history.

(56) References Cited

U.S. PATENT DOCUMENTS

| | | | | | |
|---|---|---|---|---|---|
| 3,828,717 | A | * | 8/1974 | Nichols | F02B 61/045 114/150 |
| 3,885,331 | A | * | 5/1975 | Mathieu | E02F 9/062 114/151 |
| 4,806,251 | A | * | 2/1989 | Durda | B01F 3/04539 210/170.05 |
| 6,530,812 | B2 | * | 3/2003 | Koyano | B63H 25/46 440/38 |
| 7,172,177 | B2 | * | 2/2007 | Durda | B01F 3/04595 261/120 |
| 2007/0281561 | A1 | * | 12/2007 | West | B63B 7/02 440/42 |
| 2010/0081348 | A1 | * | 4/2010 | Giroux | B63H 11/113 440/42 |
| 2010/0131133 | A1 | * | 5/2010 | Koda | G05D 1/0206 701/21 |

FOREIGN PATENT DOCUMENTS

DE        EP 2504089 B1 * 11/2013 ............. A01C 3/026

* cited by examiner

*Primary Examiner* — Charles Cooley
*Assistant Examiner* — Marc C Howell
(74) *Attorney, Agent, or Firm* — Brett J. Trout

(57) ABSTRACT

A floating manure agitator that floats on the surface of a manure lagoon and that may be remotely controlled to agitate manure supernatant into a slurry with sludge settling on the bottom of the lagoon. The agitator is provided with a plurality of fluid outputs, the direction of which may be controlled to motivate and steer the agitator. The outputs are angled to develop vortices of supernatant into the sludge to further mix the materials into a slurry.

20 Claims, 9 Drawing Sheets

FLOATING MANURE AGITATOR

TECHNICAL FIELD

The present invention relates in general to a manure agitator and, more particularly, to a floating manure agitator for use in association with a manure lagoon.

BACKGROUND

Livestock produce a large amount of manure. The high nitrogen content of the manure makes it useful as a fertilizer on agricultural fields. While manure is continually produced, it is only needed as fertilizer during certain times of the year. During the times it is being produced and not yet needed, it must be stored. It is also desirable to break down the manure prior to application as a fertilizer. One method of storing and breaking down livestock manure is a manure lagoon. Manure lagoons are sloped, fluid impermeable pits fifteen to thirty-five feet deep and may be several hundred feet across.

Manure from a livestock operation is pumped into a lagoon where anaerobic bacteria digest, liquefy, and convert a portion of the manure to carbon dioxide, methane, ammonia and hydrogen sulfide. The resulting supernatant contains nitrogen and calcium. The resulting solids form a sludge that rests on the bottom of the manure lagoon. The sludge is made up of several biodegradable organic solids, including lignin and cellulose. The sludge also contains high concentrations of phosphorous. After anaerobic bacteria breaks down the manure, the manure is pumped from the lagoon to a tank for transport and then applied to an agricultural field.

To prevent an undesirable buildup of sludge at the bottom of the lagoon, it is known in the art to place an agitator within the lagoon to create a slurry by moving solids in sludge into suspension within the supernatant. Prior art methods of agitating the manure include attaching a shaft with a propeller or auger to the power takeoff of a tractor or other farm vehicle resting on the shore. The rotating propeller or auger forces the supernatant down into the sludge, causing the solids within the sludge to move upward into suspension within the supernatant. While this method does place some solids into suspension, the method has several drawbacks. One drawback is that the propeller or auger forces sludge up from the bottom of the lagoon in only a narrow area. While the propeller or auger may be moved to provide a more even distribution of solids within the supernatant, moving the propeller or auger is time consuming.

Alternatively, the propeller or auger may be rotated at an increased speed to move more sludge to move into suspension. One drawback associated with increasing the speed of rotation of the propeller or auger is the increased risk to the bottom of the lagoon. If the speed of the rotation of the propeller or auger is increased too much, the bottom of the lagoon may be damaged, allowing the manure to leak into the ground water. Yet another drawback associated with the prior art is mixing sludge at the center of the lagoon. Prior art agitators are typically operated from shore. Even with long agitators it is difficult to mix sludge at the center of the lagoon, which leads to a buildup of sludge at the center of the lagoon. It would, therefore, be desirable to provide deep agitation at the center of the lagoon, to more thoroughly suspend the sludge solids within the supernatant.

It is also known in the art to provide a large vehicle that may be lowered into the lagoon. The vehicle may be equipped with a fluid intake, a pump and a fluid output to draw supernatant into the pump and force the supernatant at high speed downward toward the sludge. The vehicle is typically moved with cables by operators on the shore.

One drawback associated with such devices is that these devices are not easily maneuverable. Another drawback associated with such prior art devices is the difficulty associated with controlling such devices. Often elaborate systems of wires and securement posts must be erected near the shores of the manure lagoon to provide a guide for the vehicle to move during the agitation process. As the vehicle typically makes several passes across the lagoon, several guide wires and posts must be set up to accommodate multiple passes. The devices can be difficult to steer during passes across the lagoon.

It would, therefore, be desirable to provide a vehicle which floats on the manure pond and which is maneuverable. It would also be desirable to provide the vehicle with multiple outlet nozzles to direct the fluid downward into the lagoon a sufficient distance to agitate the solids in the bottom of the lagoon into suspension and create vortices within the lagoon to assist in carrying solids within the sludge into suspension in the supernatant. It would additionally be desirable to direct the nozzles to create vortices that mix the solids of the sludge into suspension with the supernatant, while minimizing the amount of unpleasant smelling hydrogen sulfide rising to the surface and escaping into the air.

It would further be desirable to provide a floating vehicle for the mixing of sludge solids into suspension with the supernatant that may be quickly and readily transported to a manure lagoon, launched into the lagoon, used to suspend sludge solids into suspension with the supernatant, and removed from the lagoon onto a trailer. It would also be desirable to provide a floating vehicle configured to the standard, height, weight and width restrictions associated with highway travel. Additionally, it would be desirable to provide a floating manure agitation vehicle that may be remotely controlled and guided to specific portions of the lagoon to move solids of the sludge into suspension with the supernatant as desired.

The difficulties encountered in the prior art discussed hereinabove are substantially eliminated by the present invention.

SUMMARY OF THE DISCLOSED SUBJECT MATTER

In the preferred embodiment of this invention, a floating manure agitator is provided with a floating vessel and a power source. A slurry pump is coupled to the power source. A slurry intake and three slurry outputs are also coupled to the slurry pump. Two of the slurry outputs are directed outward from the floating vessel. The slurry intake is provided between the two rearward slurry outputs. An additional slurry output is provided closer to the bow of the floating vessel and is provided with a steering control to direct the slurry output to control the direction of the floating vessel. The two aft slurry outputs may be rotated more rearward to increase the speed of the floating vessel or rotated more stern to slow or reverse the speed of the floating vessel, or move downward to direct more of the supernatant into the sludge. A remote control device may be coupled to the slurry control to allow the floating vehicle to be steered from the shore.

BRIEF DESCRIPTION OF THE DRAWINGS

The present invention will now be described, by way of example, with reference to the accompanying drawings in which.

DETAILED DESCRIPTION OF THE DRAWINGS

Figure 1:
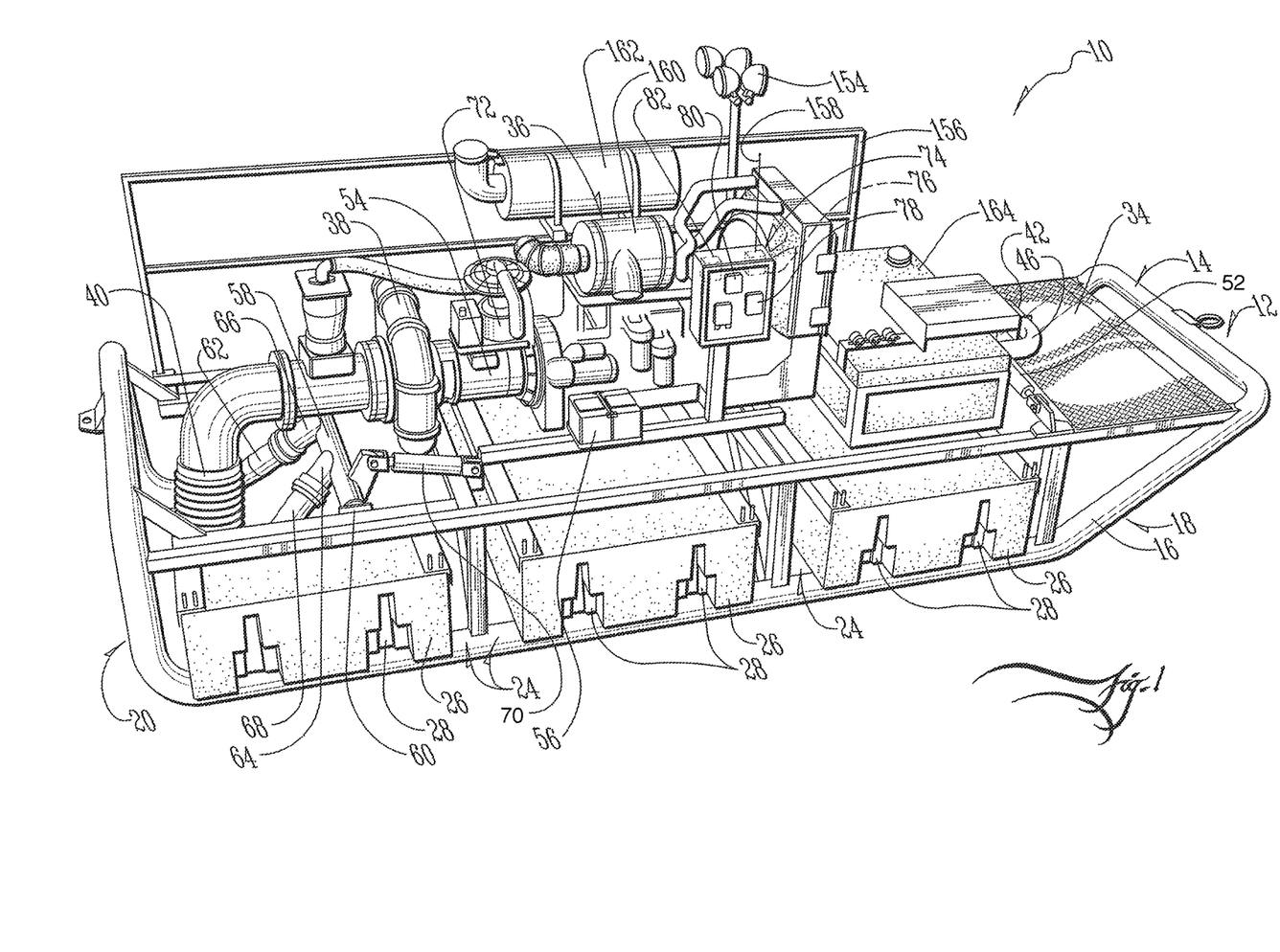
FIG. 1 illustrates a side perspective view of the floating manure agitator of the present invention.
Figure 2:
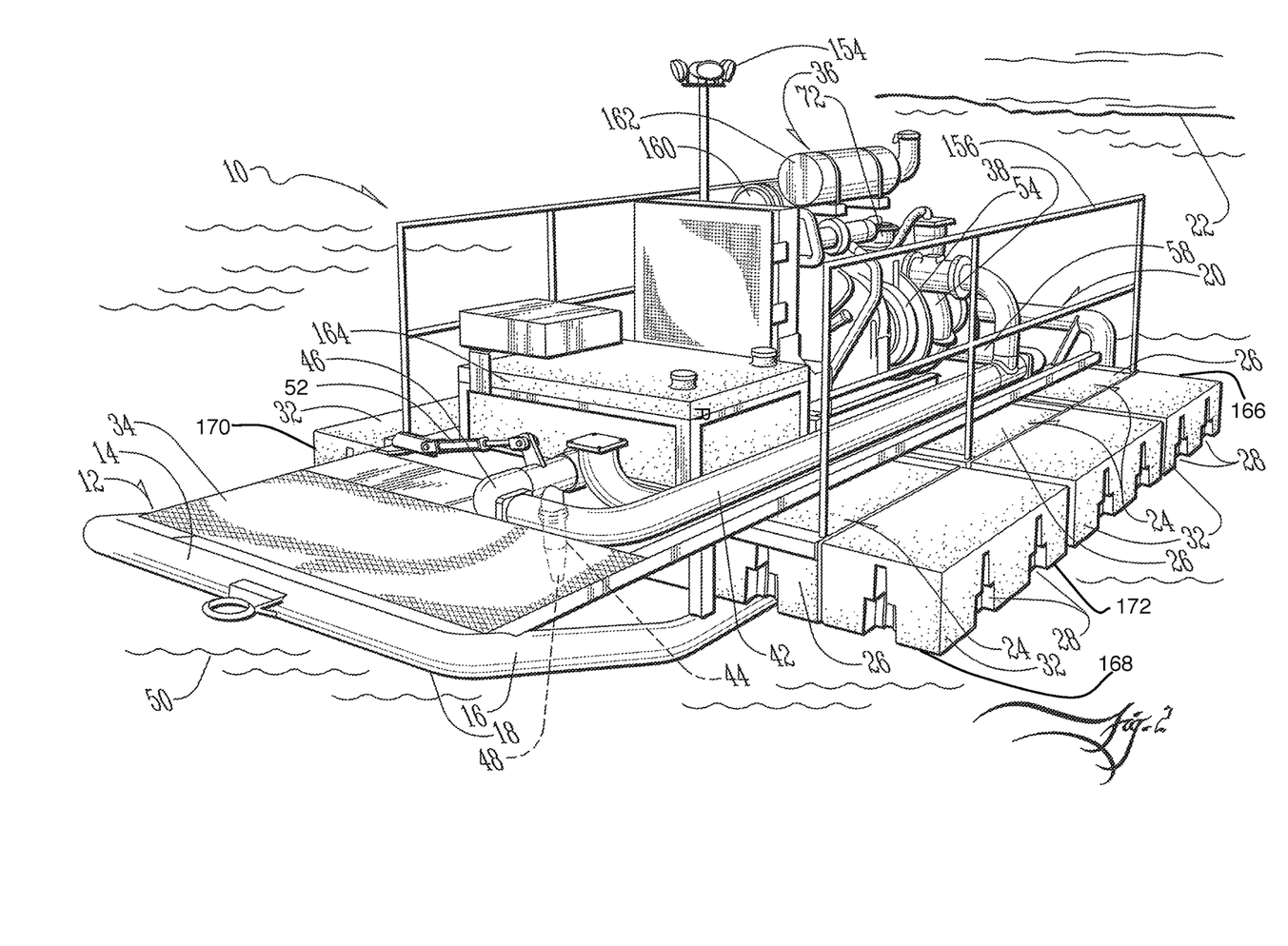
FIG. 2 illustrates a front perspective view of the floating manure agitator of FIG. 1, being retrieved from a manure lagoon.

A floating fluid agitator is shown generally as (10) in FIG. 1. A vessel (12) is provided having a frame (14) preferably constructed of welded tubular steel pipes (16). The vessel (12) may alternatively be constructed of any suitable material or may be constructed with a more standard hull, such as those known in the art. The frame (14) is constructed with an angled bow (18) and a vertical stern (20). The angled bow (18) facilitates the launch and retrieval of the agitator (10) from a manure lagoon (22). (FIGS. 1-2). The frame (14) defines a plurality of receiver slots (24) into which are provided modular dock sections (26), such as those known in the art. In the preferred embodiment, the dock sections (26) are 1000 series dock components manufactured by Connect-A-Dock, Inc. of Atlantic, Iowa.

Figure 3:
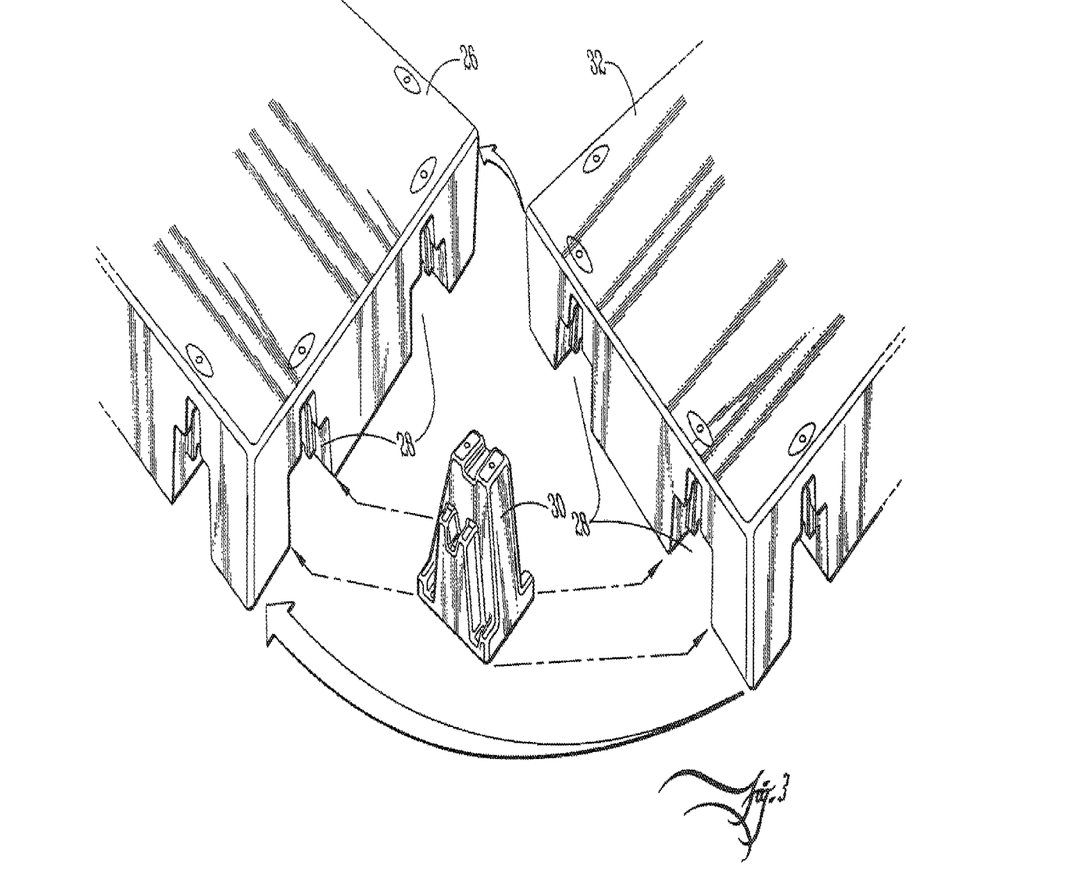
FIG. 3 illustrates a top perspective view of the modular dock sections and connector pin.

The modular dock sections (26) are provided with connector slots (28) to fit into interlocking mating engagement with connector pins (30). The connector pins (30) allow the modular dock sections (26) to connect to additional dock sections (32) in a manner such as that known in the art. (FIGS. 1 and 3). The use of interlocking additional dock sections (32) allows for the buoyancy of the vessel (12) to be increased and allows the additional dock sections (32) to be removed to reduce the overall width of the agitator (10) for transport and storage. If desired, pontoons, inflatable components or any other type of buoyant material may be used in place of, or in addition to, the modular dock sections (26) and additional dock sections (32). Preferably, the vessel (12) has ten to fifty inches of draw, more preferably between fifteen and thirty inches of draw, and most preferably about twenty-six inches of draw.

The vessel (12) is provided with a deck (34) and a power source (36). (FIGS. 1-2). The deck (34) has a front (166), a rear (168), a first side (170), and a second side (172) wherein the first side (170) is opposite the second side (172). While the power source (36) may be any suitable power source, in the preferred embodiment the power source (36) is a John Deere Tier 3 diesel engine. Depending on the desired size and efficiency of the agitator (10), the power source (36) is preferably between twenty and two-thousand horsepower, more preferably between fifty and five hundred horsepower, and most preferably between one hundred fifty and two hundred fifty horsepower.

Coupled to the power source (36) is a liquid manure pump such as a slurry pump (38). In the preferred embodiment, the slurry pump (38) is a Cornell Redi-Prime centrifugal pump capable of handling both solid and liquid material. The slurry pump (38) is preferably designed to move between one thousand and twenty-four thousand liters of material per minute, more preferably between eight thousand and twenty thousand liters of material per minute, and most preferably about sixteen thousand liters of material per minute.

Figure 4:
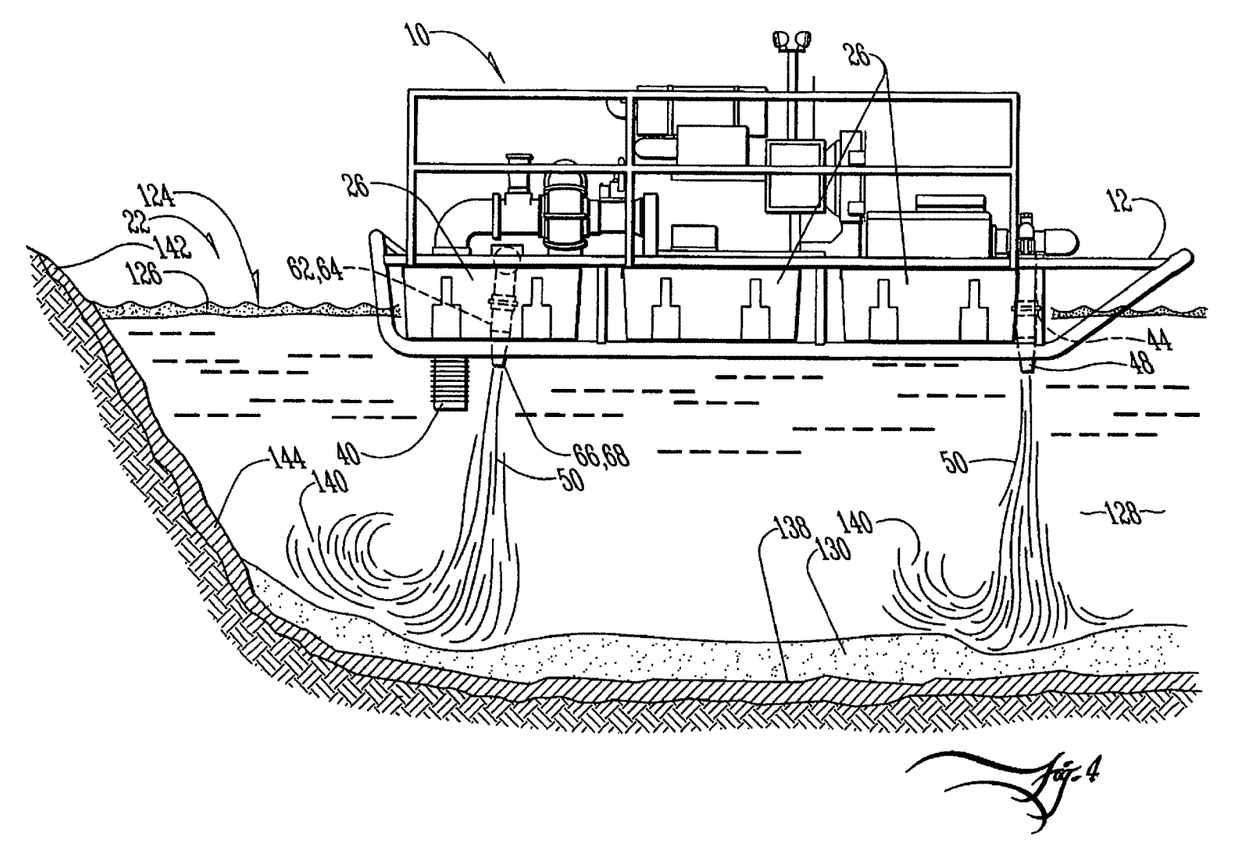
FIG. 4 illustrates a side elevation of the floating manure agitator of FIG. 1 on a manure lagoon.

The slurry pump (38) is coupled to a liquid manure intake, such as a slurry intake, which is a downwardly directed intake pipe (40) in the preferred embodiment and is capable of handling manure crust, supernatant, sludge and the combined slurry. (FIGS. 1 and 4). If desired, the intake pipe (40) may be extensible to adjust the depth of the intake pipe (40). The intake pipe (40) is constructed to extend about twenty-four inches below the surface of the lagoon (22), but may be extended or retracted to any desired depth, including the entire depth of the lagoon (22).

Figure 5:
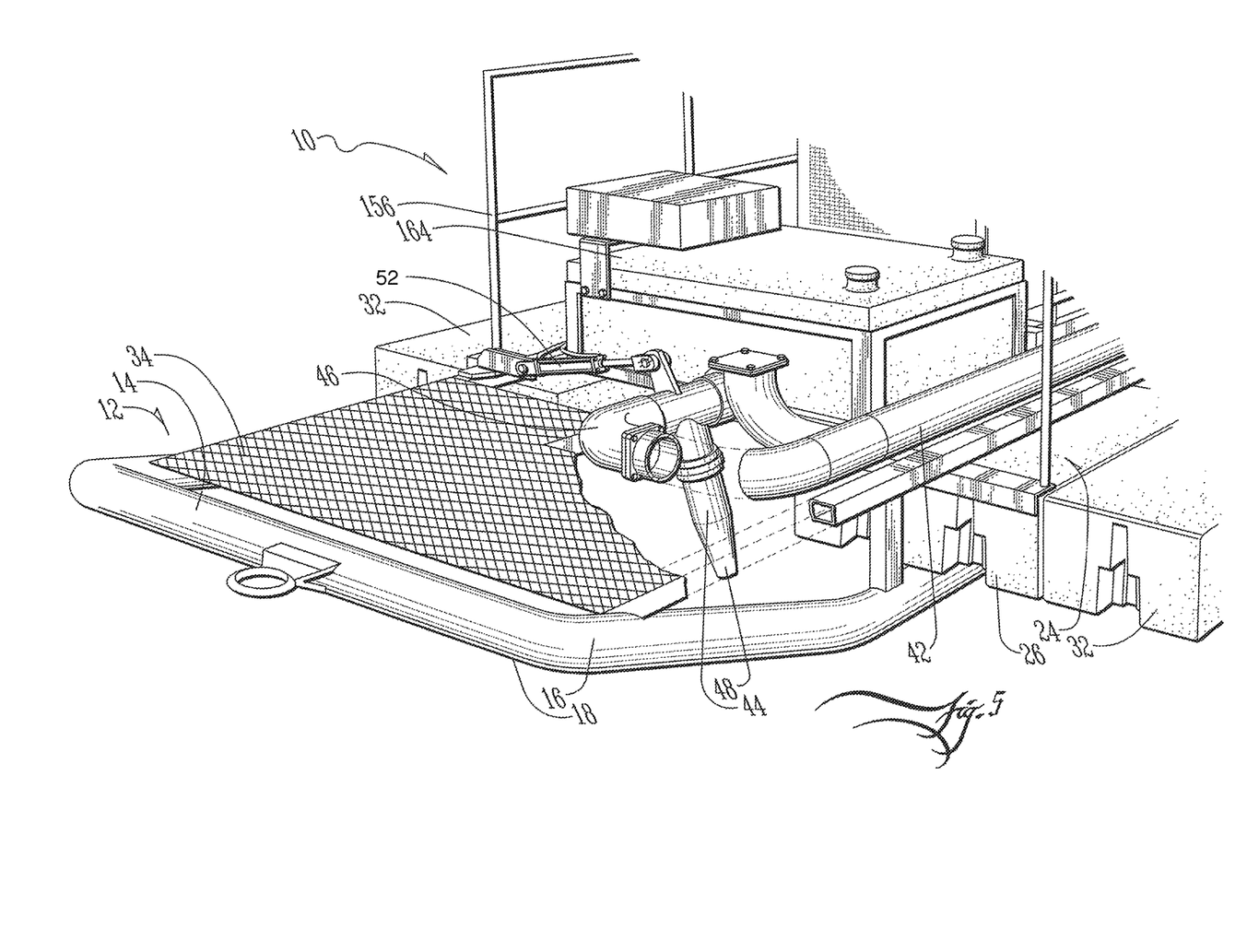
FIG. 5 illustrates a front perspective view of the floating manure agitator of FIG. 1.

Coupled to the slurry pump (38) by a transport pipe (42) is a first slurry output (44). (FIG. 5). The first slurry output (44) is an angled pipe (46) pivotably coupled to the transport pipe (42). Releasably coupled to the angled pipe (46) is a tapered liquid manure nozzle (48) to increase the velocity of slurry (50) passing through the nozzle (48). (FIGS. 4-5). If desired, different sizes and configurations of nozzles (48) may be coupled to the angled pipe (46) to adjust the direction and velocity of slurry (50) exiting through the first slurry output (44). Coupled between the angled pipe (46) and the frame (14) is a steering control hydraulic cylinder (52). The hydraulic cylinder (52) is coupled to a hydraulic pump (54) that, in turn, is coupled to a 12-volt battery (56). (FIGS. 1 and 5).

Figure 6:
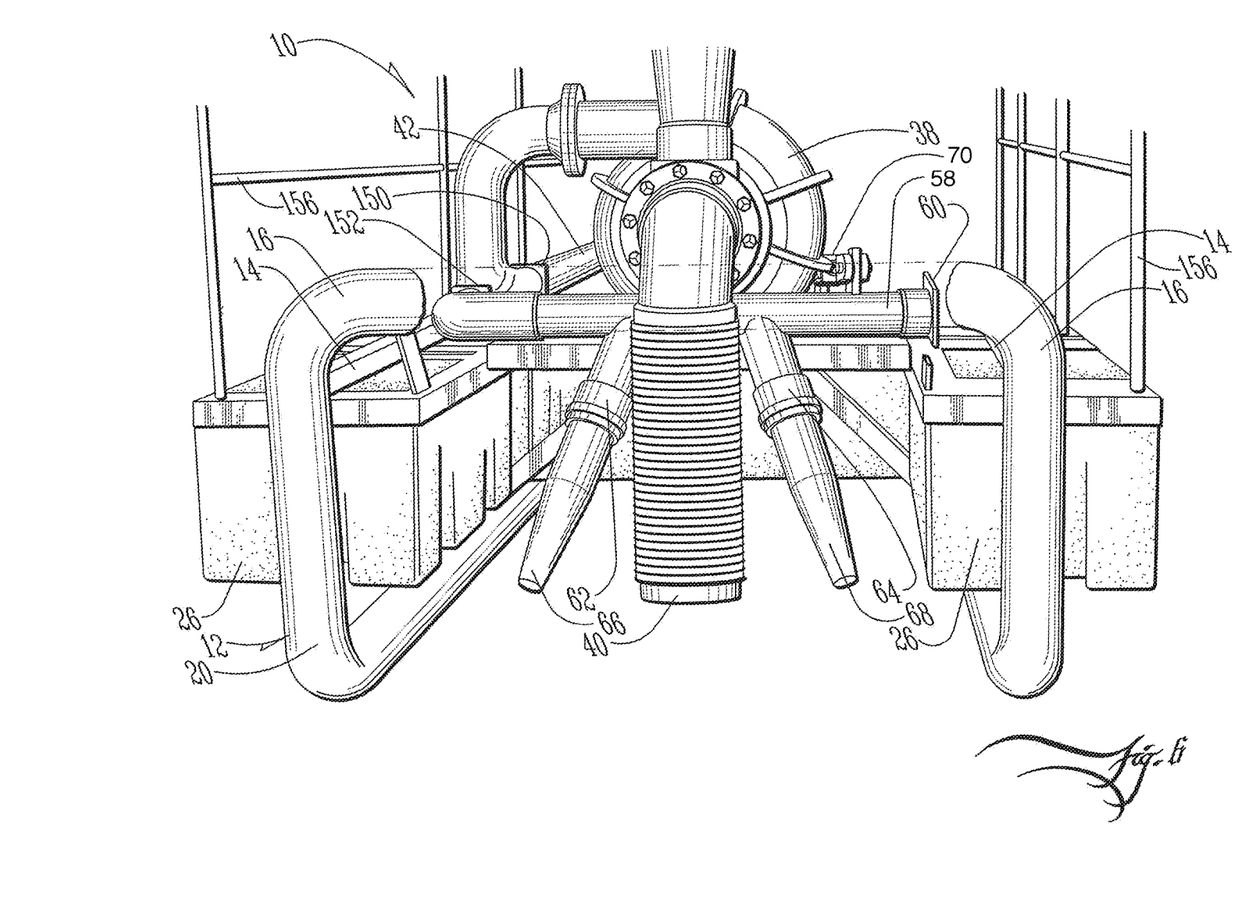
FIG. 6 illustrates a front perspective view of the floating manure agitator of FIG. 1.

As shown in FIG. 6, journaled to the rear outlet of the transport pipe (42) is a pivot pipe (58). The pivot pipe (58) is also journaled to a bearing (60) secured to the frame (14). (FIG. 6). Depending from the pivot pipe (58) are a second slurry output (62) and a third slurry output (64). Preferably the slurry outputs (62) and (64) are angled outward from the centerline of the vessel (12), along which the intake pipe (40) is located. (FIGS. 4 and 6).

Releasably coupled to the second slurry output (62) and third slurry output (64) are a pair of nozzles (66) and (68) pivotably coupled to the vessel (12). The second slurry output (62) and third slurry output (64) are oriented and configured to direct the slurry (50) as desired and to increase the velocity with which the slurry (50) exits the nozzles (66) and (68). The second slurry output (62) is preferably directed between five and eighty degrees toward the first side (170) of the deck (34), more preferably directed between ten and sixty degrees toward the first side (170) of the deck (34) and, most preferably, between fifteen and forty-five degrees toward the first side (170) of the deck (34). The third slurry output (64) is preferably directed between five and eighty degrees toward the second side (172) of the deck (34), more preferably between ten and sixty degrees toward the second side (172) of the deck (34) and, most preferably, between fifteen and forty-five degrees toward the second side (172) of the deck (34). The intake pipe (40) is preferably positioned between the first slurry output (44) and the second slurry output (62).

Coupled between the pivot pipe (58) and the frame (14) is a hydraulic cylinder (70) that rotates the pivot pipe (58) to direct the second slurry output (62) and third slurry output (64) preferably between 90 degrees rearward and 90 degrees forward from a downward position, more preferably between 60 degrees rearward and 60 degrees forward, and most preferably at least about 45 degrees rearward and 45 degrees forward.

Figure 7:
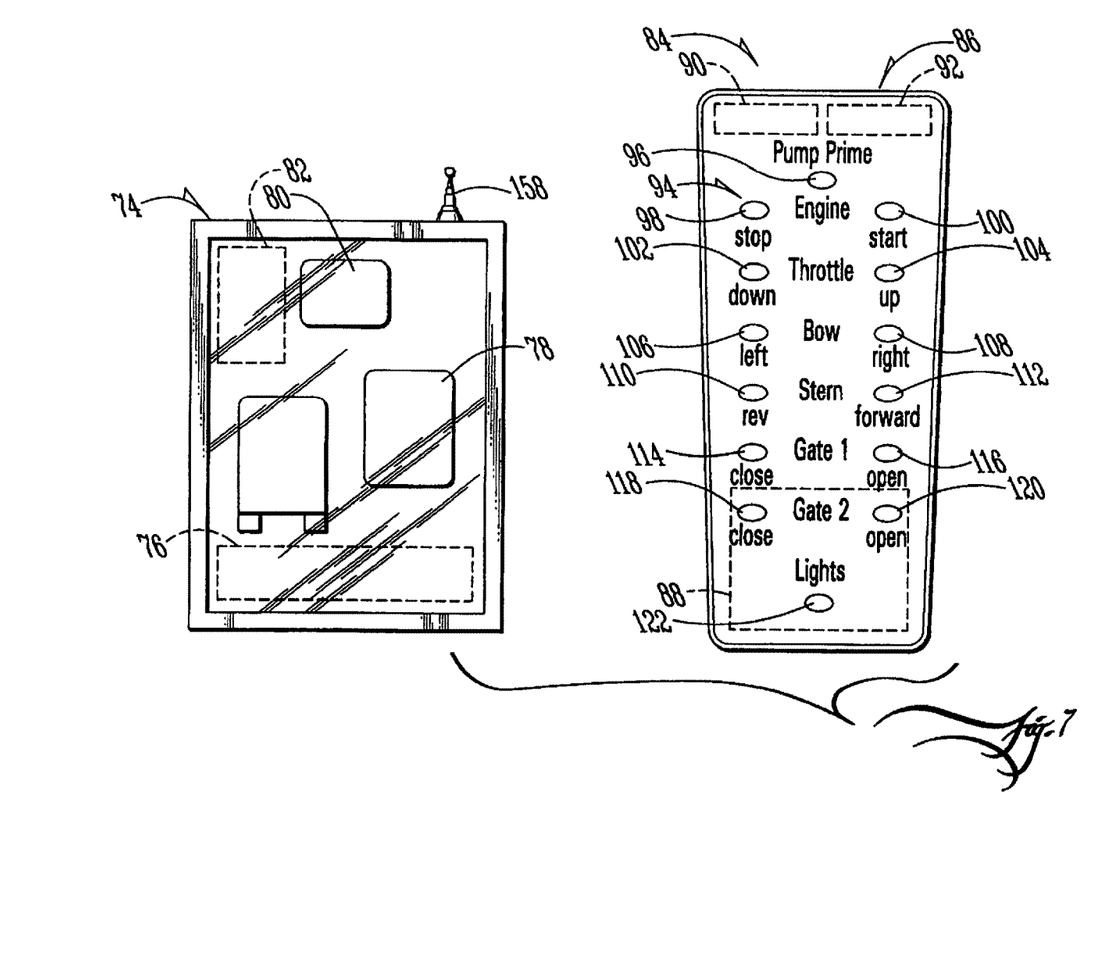
FIG. 7 illustrates a block diagram in partial cutaway of the control panel and portable computer.

The hydraulic cylinder (70) is coupled to the hydraulic pump (54). The hydraulic pump (54) is coupled to a control manifold (72) that is electronically coupled to a control panel (74) provided with a central processing unit (76) and a global positioning system (78). (FIGS. 1 and 7). Also coupled to the control panel (74) are a wireless receiver (80) and wireless transmitter (82), that allow the control panel (74) to operate as a wireless remote control, actuated by a remote control system (84). (FIGS. 1 and 5). The remote control system (84) may be a portable computer (not shown) or simply a handset (86) provided with a battery (88), wireless transmitter (90) and a wireless receiver (92). The remote control system (84) may be provided with one or more joysticks, touchscreens, keyboards or other input devices known in the art (not shown), to allow the remote control system (84) to accept commands. In the preferred embodiment, the remote control system (84) is provided with a plurality of buttons (94) as shown in FIG. 7. The remote control system (84) is provided with a pump prime button (96). The prime pump button (96) signals the control panel (74) to circulate fluid within the slurry pump (38) to prime the pump (38) prior to use.

The remote control system (64) also includes an engine stop button (98), start button (100), a throttle down button (102) and throttle up button (104). To steer the agitator (10) the remote control system (84) is provided with a bow left button (106) and bow right button (108). The bow left button (106) causes the steering control hydraulic cylinder (52) to extend, thereby directing the nozzle (48) to starboard and driving the agitator (10) port. The remote control system (84) is also provided with a bow right button (108) to retract the hydraulic cylinder (52) and steer the agitator (10) starboard. The remote control system (84) is provided with a reverse button (110) which causes the hydraulic cylinder (70) to extend, thereby forcing the pivot pipe (58) to direct the slurry outputs (62) and (64) toward the bow (18) of the agitator (10), thereby driving the vessel (12) rearward. Similarly, a forward button (112) causes the hydraulic cylinder (70) to retract and drive the agitator (10) forward.

If desired, the remote control system (84) may be provided with a first gate close button (114) that closes a valve (115) on the transport pipe (42) positioned between the fluid intake pipe (40) and forward nozzle (48). A gate open button (116) is also provided to open the valve (150). Similarly, a close gate button (118) and open gate button (120) are provided to open and close a valve (152) provided between the fluid intake pipe (40) and the nozzles (66) and (68). The gate buttons (114), (116), (118) and (120) allow a user to selectively supply fluid through one, two or three of the nozzles (48), (66) and (68) as is desired to appropriately agitate the fluid (128) within which the agitator (10) is floating. The remote control system (84) is also provided with a button (122) to actuate lights (154) provided on the agitator (10) if it is desired to use the agitator (10) in circumstances where additional lighting is desired. The remote control system (84) may be configured to receive feedback from the control panel (74), such as system status, latitude, longitude and height coordinates.

Figure 8:
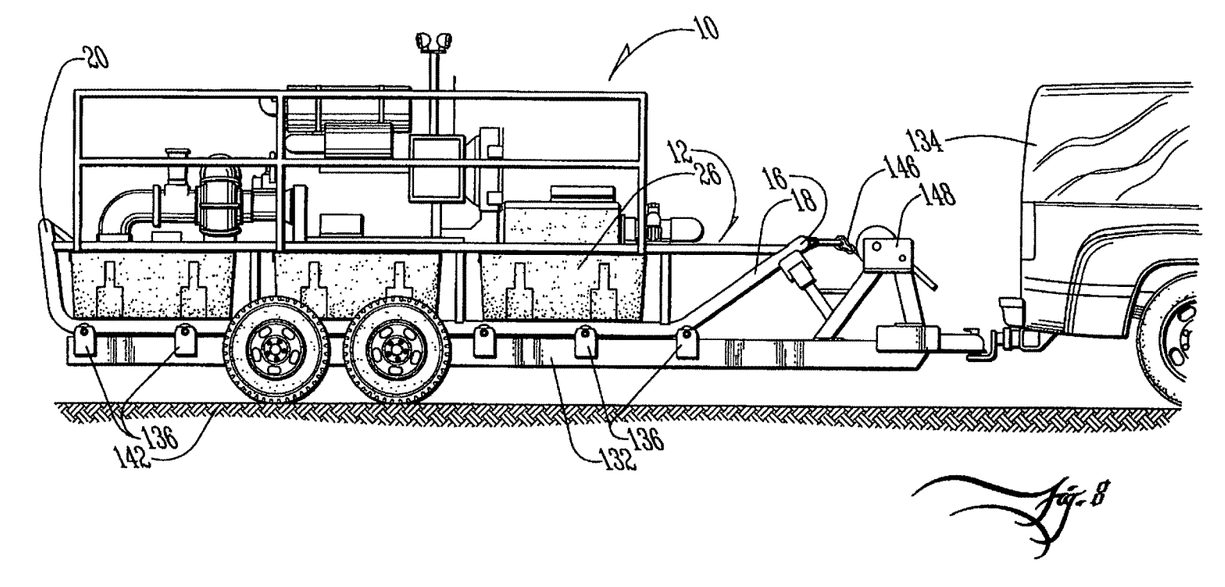
FIG. 8 illustrates a side perspective view of the floating manure agitator of FIG. 1 being transported.

When it is desired to use the agitator (10) to agitate manure (124), that has separated into crust (126), supernatant (128) and sludge (130), into a slurry (50), the agitator (10) is preferably transported to the manure lagoon (22) using a trailer (132) and pulling vehicle (134). (FIGS. 4 and 8). Once at the manure lagoon (22), the additional dock sections (32) are placed into mating engagement with the modular dock sections (26) and the trailer is backed toward the lagoon (22). (FIGS. 1, 4, 8 and 9). Depending upon the angle of the trailer (132), the agitator (10) may roll off the trailer (132) by the force of gravity or may be manually pushed from the trailer (132) into the lagoon (22). If desired, the trailer (132) may be fitted with a plurality of rollers (136) to facilitate the removal of the agitator (10) from the trailer (132).

Once the agitator (10) is floating in the lagoon (22), the remote control system (84) is used to activate the power source (36) to cause the slurry pump (38) to draw supernatant (128) into the intake pipe (40) and out the outputs (44), (62) and (64). The remote control system (84) is used to direct the pivot pipe (58) to angle the slurry outputs (62) and (64) rearward to drive the agitator (10) forward. The remote control system (84) then actuates the control panel (74) to direct the hydraulic cylinder (52) to angle the first slurry output (44) to turn the agitator (10) port or starboard as desired. The remote control system (84) is thereafter used to direct the volume of supernatant (128) drawn into the intake pipe (40) and the direction at which the supernatant (128) is expelled from the slurry outputs (44), (62) and (64). By manipulating the direction of the slurry outputs (44), (62) and (64) with the remote control system (84), a user may direct the agitator (10) to any desired portion of the lagoon.

As the agitator (10) moves across the lagoon (22), the agitator (10) breaks up the crust (126) as it draws supernatant (128) into the intake pipe (40). The agitator (10) then forces the supernatant (128) downward into the lagoon (22) with sufficient force to cause the sludge (130) at the bottom (138) of the lagoon (22) to mix with the supernatant (128) and to form the slurry (50). The angle of the slurry outputs (62) and (64) causes the supernatant (128) to generate vortices (140) near the bottom (138) of the lagoon (22) to cause additional mixing between the supernatant (128) and sludge (130).

The remote control system (84) may be used to cause the slurry pump (38) to expel slurry (50) more slowly from the slurry outputs (44), (62) and (64) as the agitator (10) is near the shore (142) of the lagoon (22) so as not to penetrate the lining (144) of the lagoon (22) thereby allowing the slurry (50) to escape. As the agitator (10) moves towards the center of the lagoon (22) which may range from five to forty feet deep, or more, the remote control system (84) can be used to increase the speed at which the supernatant (128) is passed from the slurry outputs (44), (62) and (64) to adequately mix the sludge (130) at the deepest portions of the lagoon (22). The remote control system (84) is used to direct the agitator (10) to all desired portions of the lagoon until the crust (126) and supernatant (128) is adequately mixed with the sludge (130).

Figure 9:
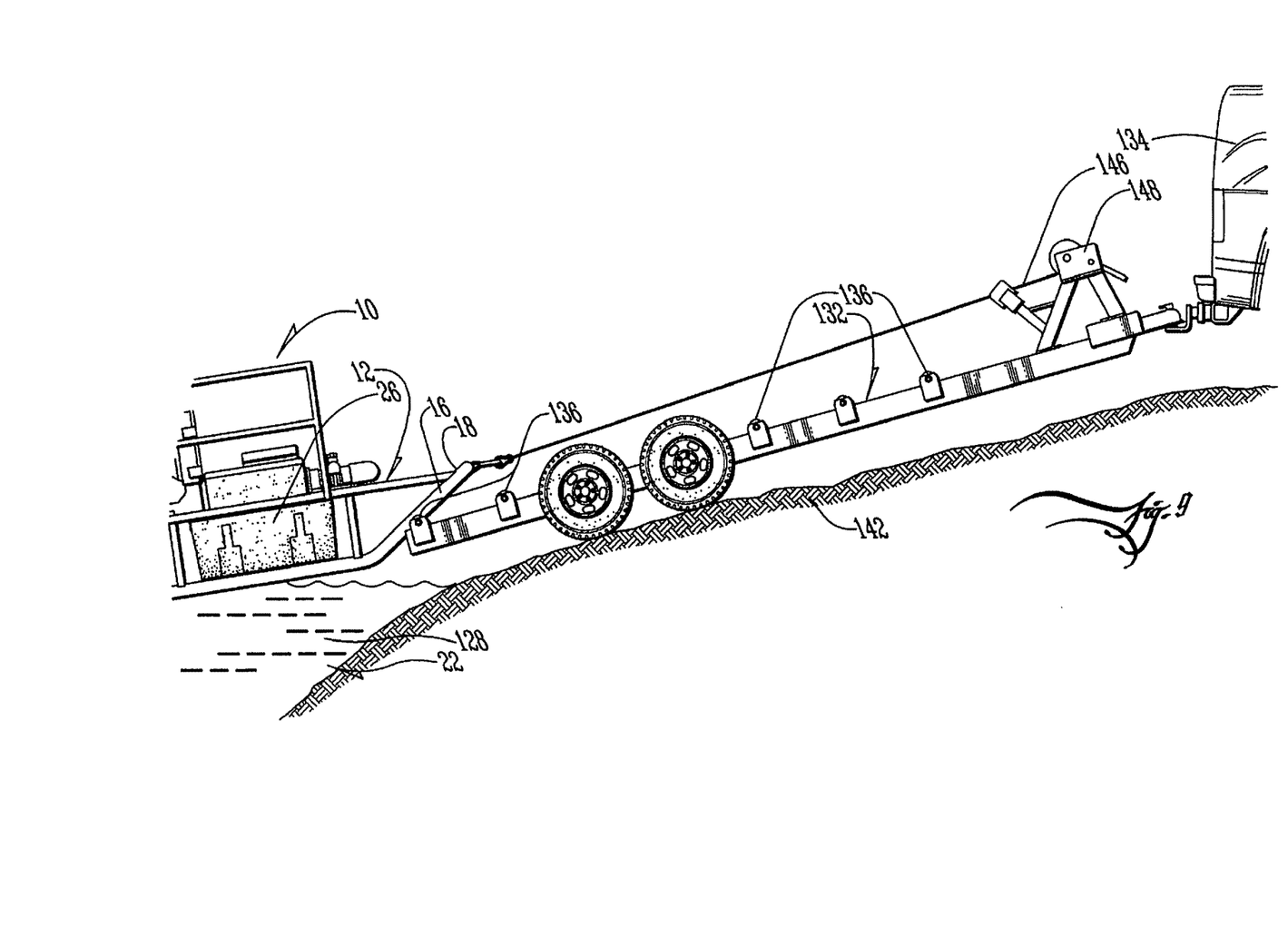
FIG. 9 illustrates a side perspective view of the floating manure agitator of FIG. 1 being retrieved from a manure lagoon.

Once the slurry (50) is adequately mixed, the remote control system (84) is used to guide the agitator (10) to the shore (142), where the agitator (10) may be coupled to a cable (146) and winch (148) provided on the trailer (132). The winch (148) is activated to draw the agitator (10) on to the trailer (132). Preferably during this procedure a hose or similar system is used to clean the slurry (50) from the agitator (10) as the agitator (10) is drawn on to the trailer (132). Once the agitator (10) has been cleaned and placed on the trailer (132), the additional dock sections (32) are removed from the modular dock sections (26) and placed upon the vessel (134) and secured for transport.

As shown in FIG. 6, the agitator (10) may be provided with a railing system (156) constructed of steel to allow a user to inspect the agitator (10). (FIG. 2). If desired, the agitator (10) may also be provided with a power antenna system (158) such as those known in the art to increase GPS and wireless reception.

As shown in FIG. 2, the air intake system (160) is preferably placed above the power source (36) to reduce the likelihood of slurry (50) blocking the air intake system (160). Similarly, the exhaust system (162) is located above the power source (36) to reduce the likelihood of the exhaust system (162) becoming blocked with slurry (50).

As shown, the fuel reservoir (164) is provided at least partially below the deck (34) of the vessel (12) to allow access to the fuel reservoir (164), while still providing the agitator (10) with a low center of gravity to increase the stability of the agitator (10).

Although the invention has been described with respect to a preferred embodiment thereof, it is to be understood that it is not to be so limited since changes and modifications can be made therein which are within the full, intended scope of this invention as defined by the appended claims.

What is claimed is:

1. A floating slurry agitator comprising:
   (a) a floating vessel having a horizontal deck, the deck having a front, a rear, a first side, and a second side, wherein the first side is opposite the second side;
   (b) a power source provided on the vessel;
   (c) a slurry pump coupled to the power source;
   (d) a slurry intake coupled to the slurry pump;
   (e) a front slurry output coupled to the slurry pump, wherein the front slurry output is directed downward, relative to the deck and wherein the front slurry output is pivotable from a first position directed at least partially toward the first side of the deck and a second position directed at least partially toward the second side of the deck;
   (f) a first rear slurry output coupled to the slurry pump;
   (g) a second rear slurry output coupled to the slurry pump;
   (h) a pivot pipe pivotably coupled to the frame;
   (i) wherein the pivot pipe is in fluid communication with the first rear slurry output and the second rear slurry output;
   (j) wherein the first rear slurry output and second rear slurry output are directed downward relative to the deck;
   (k) wherein the pivot pipe is sufficiently pivotable to direct the first rear slurry output and the second rear slurry output at least partially rearward; and
   (l) wherein the first rear slurry output and the second rear slurry output are coupled to the pivot pipe and positionally fixed relative to one another in a manner in which the first slurry output and the second slurry output pivot as a single unit;
   (m) wherein the first rear slurry output is directed between five degrees and eighty degrees relative to the deck toward the second side of the deck;
   (n) wherein the second rear slurry output is directed between five degrees and eighty degrees relative to the deck toward the first side of the deck; and
   (o) a directional controller coupled to the front slurry output.

2. The floating slurry agitator of claim 1, further comprising a wireless remote control coupled to the directional controller.

3. The floating slurry agitator of claim 2, wherein the directional controller comprises a hydraulic cylinder coupled between the vessel and the front slurry output.

4. The floating slurry agitator of claim 1, wherein the directional controller is a steering control.

5. The floating slurry agitator of claim 4, further comprising a wireless remote control coupled to the steering control.

6. The floating slurry agitator of claim 4, wherein the steering control comprises a hydraulic cylinder coupled between the vessel and the front slurry output.

7. The floating slurry agitator of claim 1, wherein the slurry intake is positioned between the front slurry output and the first rear slurry output.

8. The floating slurry agitator of claim 7, further comprising a wireless remote control coupled to the directional controller.

9. The floating slurry agitator of claim 1, wherein the pump has a throughput capacity of at least four thousand liters per minute.

10. The floating slurry agitator of claim 1, wherein the pump has a throughput capacity of at least eight thousand liters per minute.

11. The floating slurry agitator of claim 1, wherein the floating vessel is provided on a manure lagoon.

12. The floating slurry agitator of claim 1, wherein the power source is a diesel engine.

13. The floating slurry agitator of claim 1, further comprising manure provided in the front slurry output, the first rear slurry output, and the second rear slurry output.

14. A floating slurry agitator comprising:
   (a) a floating vessel having a horizontal deck, the deck having a front, a rear, a first side, and a second side, wherein the first side is opposite the second side;
   (b) a power source provided on the vessel;
   (c) a slurry pump coupled to the power source;
   (d) a slurry intake coupled to the slurry pump;
   (e) a front slurry output coupled to the slurry pump, wherein the front slurry output is directed downward, relative to the deck and wherein the front slurry output is pivotable from a first position directed at least partially toward the first side of the deck and a second position directed at least partially toward the second side of the deck;
   (f) a first rear slurry output coupled to the slurry pump;
   (g) a second rear slurry output coupled to the slurry pump;
   (h) a pivot pipe pivotably coupled to the frame;
   (i) wherein the pivot pipe is in fluid communication with the first rear slurry output and the second rear slurry output;
   (j) wherein the pivot pipe is secured to the first rear slurry output and the second rear slurry output in a manner that prevents the first rear slurry output from moving independently relative to the second rear slurry output;
   (k) wherein the first rear slurry output and second rear slurry output are directed downward relative to the deck;
   (l) wherein the pivot pipe is sufficiently pivotable to direct the first rear slurry output and the second rear slurry output at least partially rearward; and
   (m) wherein the first rear slurry output is directed between five degrees and eighty degrees relative to the deck toward the second side of the deck;
   (n) wherein the second rear slurry output is directed between five degrees and eighty degrees relative to the deck toward the first side of the deck; and
   (o) a directional controller coupled to the front slurry output.

15. The floating slurry agitator of claim 14, further comprising a wireless remote control coupled to the directional controller.

16. The floating slurry agitator of claim 15, wherein the directional controller comprises a hydraulic cylinder coupled between the vessel and the front slurry output.

17. The floating slurry agitator of claim 14, wherein the slurry intake is positioned between the front slurry output and the first rear slurry output.

18. The floating slurry agitator of claim 14, wherein the pump has a throughput capacity of at least four thousand liters per minute.

19. The floating slurry agitator of claim 14, wherein the floating vessel is provided on a manure lagoon.

20. The floating slurry agitator of claim 14, further comprising manure provided in the front slurry output, the first rear slurry output, and the second rear slurry output.

* * * * *